(12) United States Patent
Stavely et al.

(10) Patent No.: US 7,349,117 B2
(45) Date of Patent: Mar. 25, 2008

(54) METHOD FOR INTRODUCTION AND LINKING OF IMAGING APPLIANCES

(75) Inventors: Donald J Stavely, Windsor, CO (US); K Douglas Gennetten, Ft Collins, CO (US); Paul M Hubel, Mt View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 322 days.

(21) Appl. No.: 11/096,339

(22) Filed: Mar. 31, 2005

(65) Prior Publication Data

US 2005/0179942 A1   Aug. 18, 2005

Related U.S. Application Data

(63) Continuation-in-part of application No. 09/628,540, filed on Jul. 31, 2000, now abandoned.

(51) Int. Cl.
*G06K 15/00* (2006.01)
*G03B 17/00* (2006.01)

(52) U.S. Cl. ..................... 358/1.15; 358/302

(58) Field of Classification Search ............... 358/1.1, 358/1.9, 1.12, 1.13, 1.15, 1.18, 474, 448, 358/402, 302; 348/211, 211.3, 211.5
See application file for complete search history.

(56) References Cited

U.S. PATENT DOCUMENTS

| | | | | |
|---|---|---|---|---|
| 5,978,521 A * | 11/1999 | Wallack et al. | ............. | 382/294 |
| 6,246,320 B1 * | 6/2001 | Monroe | ..................... | 340/506 |
| 6,612,930 B2 * | 9/2003 | Kawagoe et al. | ............. | 463/33 |
| 6,662,036 B2 * | 12/2003 | Cosman | ..................... | 600/411 |
| 6,774,935 B1 * | 8/2004 | Morimoto et al. | ........ | 348/211.5 |
| 2001/0032335 A1 * | 10/2001 | Jones | ......................... | 725/105 |
| 2002/0067412 A1 * | 6/2002 | Kawai et al. | ............... | 348/211 |
| 2002/0171741 A1 * | 11/2002 | Tonkin et al. | ........... | 348/211.3 |
| 2003/0229735 A1 * | 12/2003 | Sorokin et al. | ............... | 710/36 |

* cited by examiner

*Primary Examiner*—Gabriel Garcia

(57) ABSTRACT

An imaging appliance family is a cooperative system of two or more imaging appliances that are linked together to share images, command and control. Imaging appliances may be linked to each other by introducing the appliances to each other, establishing a communications link, and exchanging appliance information. The appliances may be introduced by a number of different manual or auto-sensing triggers, including buttons and presence detect circuits. Communications may be automatically established in response to the introduction. After communications are established, appliance information is exchanged and the appliances are dynamically configured into a cooperative system. Once linked, the appliances remain logically connected until they are removed from the family.

14 Claims, 7 Drawing Sheets

METHOD FOR INTRODUCTION AND LINKING OF IMAGING APPLIANCES

This application claims the benefit of U.S. application Ser. No. 09/698,364, filed Oct. 27, 2000, for METHOD FOR INTRODUCTION AND LINKING OF IMAGING APPLIANCES of Donald J. Stavely et al., which is hereby incorporated by reference for all that is disclosed therein.

CROSS-REFERENCES TO RELATED APPLICATIONS

This is a continuation-in-part of application Ser. No. 09/628,540 filed Jul. 31, 2000, now abandoned.

BACKGROUND OF THE INVENTION

1. Field of the Invention

This invention relates generally to a system of two or more imaging appliances linked together to form a cooperative system, and more specifically, to a method for introducing and linking the imaging appliances to form the cooperative system.

2. Description of Related Art

In the past, imaging appliances have been connected together for specific purposes. Scanners and printers have long had the capability to connect with a personal computer ("PC") for purposes of receiving and printing images. These connections have typically been made with a cable, such as a parallel port, SCSI (Small Computer System Interface), or USB (Universal Serial Bus). Portable digital imaging appliances, such as digital cameras and hand scanners (e.g., Hewlett-Packard's Capshare appliance), have had the capability to communicate image files via an wireless link, such as a IrDA (Infrared Data Association) link. Moreover, with the advance of digital cameras it is not uncommon to find cameras using a wide variety of wired communication links such as standard RS-232 serial links, USB (universal serial bus), IEEE-1394, a.k.a. "firewire" (Institute of Electrical and Electronic Engineers), and even S-video. However, most of these communications links were basically designed to allow the transfer of digital image files between two appliances.

Multiple cameras have been linked together in the past to take panoramic and three-dimensional ("3D") photographs. In the case of panoramic photography, multiple cameras may be distributed around an object to each take a single photograph that is later combined into a single panoramic photograph. In the case of 3D photographs, two cameras are situated a few inches apart to duplicate the spacing of our eyes which provides stereo or 3D vision.

The cameras are typically linked together with a common cable release. The common cable release makes it possible to simultaneously fire any set of cameras that have a provision for a mechanical cable release to be screwed in. Thus, although systems of cameras have been designed to operate together, the primitive techniques used to join them together into a working system is very limited in it use and cumbersome to configure.

Therefore, it is desirable to obtain a dynamically configurable system of imaging appliances capable of cooperating together for a variety of purposes.

SUMMARY OF THEE INVENTION

The invention may be implemented as a method of establishing a relationship between two or more imaging appliances. The method may include introducing a pair of imaging appliances to each other, and linking together the pair of imaging appliances in a persistent relationship as a result of the introducing. If a first one of the pair of imaging appliances is a member of a family of imaging appliances, the second one of the pair of imaging appliances is linked into the family of imaging appliances as a result of the introducing. The introducing step may include: simultaneously actuating a button on each imaging appliance; simultaneously touching the pair of imaging appliances together; a user simultaneously touching both imaging appliances; and pointing the pair of imaging at each other. An secure link may be established by exchanging a shared encryption key. A networking protocol may also be established. The imaging appliances may be unlinked by instructing one of the pair of imaging appliances to unlink.

The invention may also be viewed as an imaging appliance, comprising a means for sending an introduction indication to a second imaging appliance in response to user control; means for receiving an introduction indication from the second imaging appliance; and means for linking to the second imaging appliance in a persistent relationship as a result of exchanging introduction indications.

The invention may also be viewed as a system of two or more imaging appliances, comprising a first imaging appliance capable of linking to another imaging appliance in a persistent relationship; a second imaging appliance capable of linking to another imaging appliance in a persistent relationship; wherein the first and second imaging appliances are linkable to each other in a persistent relationship in response to a user causing the first and second imaging appliances to communicate an introduction indication to each other.

Other features and advantages of the invention will become apparent to one or ordinary skill in the art upon examination of the following detailed description of illustrative embodiments in conjunction with the accompanying drawings. It is intended that all such features and advantages be included herein within the scope of the invention and protected by the claims.

BRIEF DESCRIPTION OF THE DRAWINGS

The foregoing and other aspects, features, and advantages of the present invention will become apparent from the following detailed description, taken in conjunction with the accompanying drawings, illustrating by way of example the principles of the invention.

DETAILED DESCRIPTION

According to a preferred embodiment of the present invention, two or more imaging appliances are dynamically connectable and configurable to form a cooperative imaging system that is capable of sharing operations and images, among other things. In the prior art, imaging appliances typically communicated only with PC's for the purpose of transferring images. The present invention avoids the limitations of the prior art by providing a linked family of imaging appliances to share data, command and control therebetween.

Figure 1:
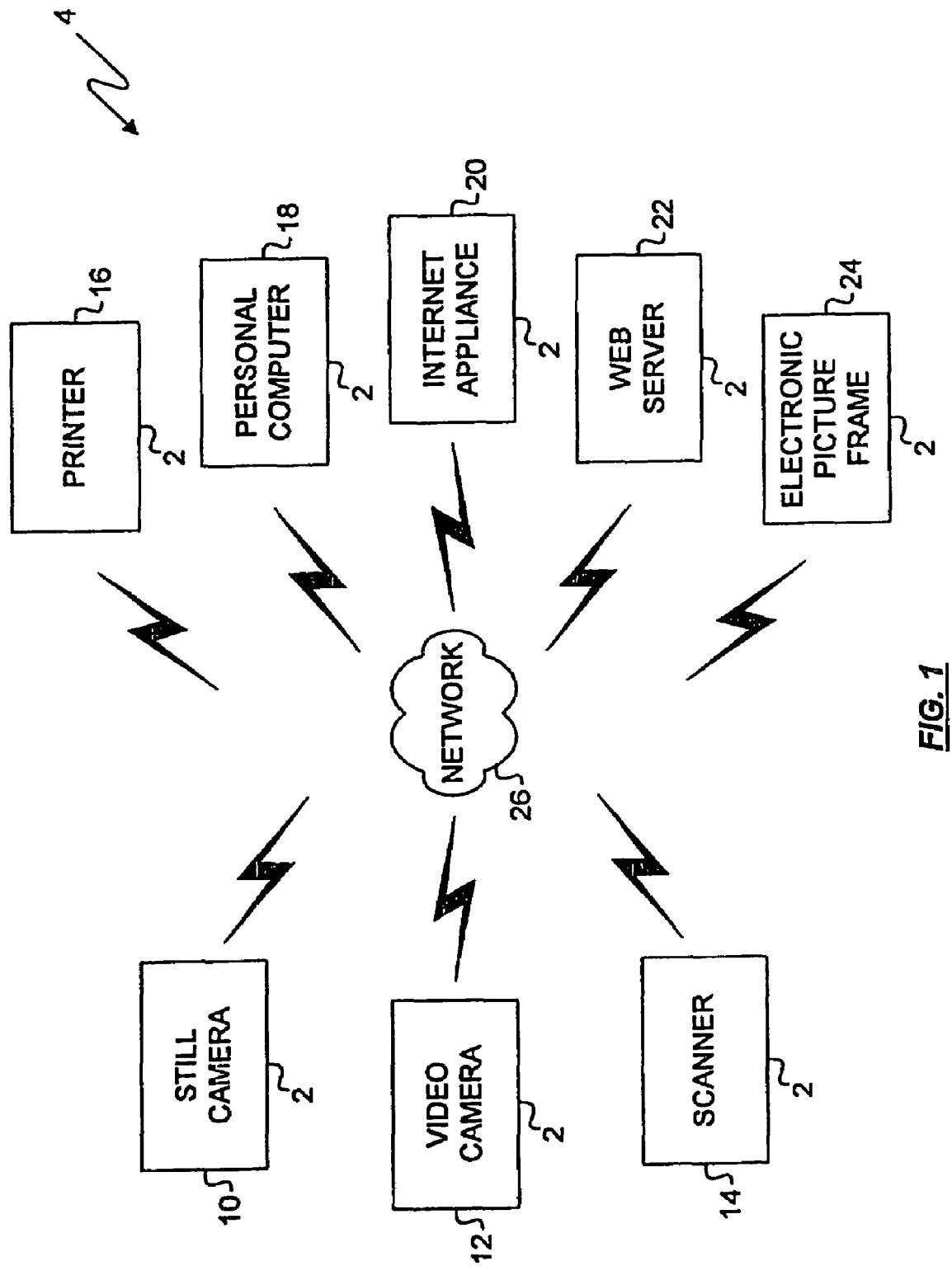
FIG. 1 is a block diagram illustrating a networked family of imaging appliances, according to a preferred embodiment.

Referring now to FIG. 1, there is illustrated a plurality of intelligent imaging appliances 2 linked together to form a family 4, according to a preferred embodiment. An imaging appliance 2 is any appliance capable of handling digital images, such as a still camera 10, a video camera 12, a scanner 14, a printer 16, a PC 18, an internet appliance 20, a web server 22, and an electronic picture frame (e.g., smart picture frame) 24. The family 4 is a collection of two or more imaging appliances 2 that are linked together to dynamically share data, command and control (i.e., collectively, operations).

A family 4 is created when at least two unlinked imaging appliances 2 are introduced to each other, a communications link is established, and the imaging appliances exchange information about each other. The family 4 is extended when any family member is introduced to an unlinked imaging appliance 2, a communications link is established, and the imaging appliances exchange information about each other. Once the communications link is established, the link is maintained so that operations may be dynamically exchanged. If the linked appliances move out of communications range of one another, a virtual communications link is maintained and operations may be deferred until the appliances are back in-range of one another. Thus, the communications link has a persistent quality about it.

The family 4 of imaging appliances 2 communicates over a network 26, such as a local area network, a wide area network, a public network (e.g., internet), a telecommunications network or a wireless network. Preferably, the network 26 is based on a low-cost, wireless communication and networking technology known as Bluetooth. Bluetooth is an industry specification written by a special interest group (SIG) whose founding members are Ericsson, IBM Corporation, Intel Corporation, Nokia and Toshiba Corporation. The Bluetooth specification, version 1.0B is hereby incorporated by reference in its entirety. The Bluetooth specification outlines a technology that sends data at 1 megabit a second between two appliances over a series of radio frequencies using a common data link and physical layer of a networking protocol stack.

The information exchanged between linked family members control how the family members interact with one another. For example, a camera 10 might provide information describing itself as a provider of images. A default configuration might be to broadcast each image captured across the network 26. An electronic picture frame 24 might provide information describing itself as an image display appliance. A default configuration might be to display every image broadcast across the network 26. As a further variation, the electronic picture frame might be configured to display images from only a certain camera 10.

A particularly good example for helping to explain the "family" concept is a wedding reception. In this example, each guest at a wedding reception is provided with a camera 10. Before the cameras 10 are handed out to the guests, the cameras 10 are linked together to form a family 4 and the family members are configured to share images with a central repository, such as the personal computer 18, internet appliance 20 or web server 22. Therefore, each picture captured by the guests is dynamically transferred to the central repository and available for all to access. To further enable the sharing of wedding pictures, one or more electronic picture frames are introduced into the family to automatically display the pictures captured by the guests. To provide all the guests with an opportunity to take home wedding memorabilia, a number of printers 16 are introduced to the family 4. Each printer 16 is configured to act as a slave to one electronic picture frame 24 so that the guests may printout selected pictures as they are displayed by the electronic picture frames 24. Thus, the wedding guests are treated to a simple, pleasurable, photography experience in which the intelligent family of imaging appliances dynamically handles the captured images according to a preconfigured arrangement.

Figure 2:
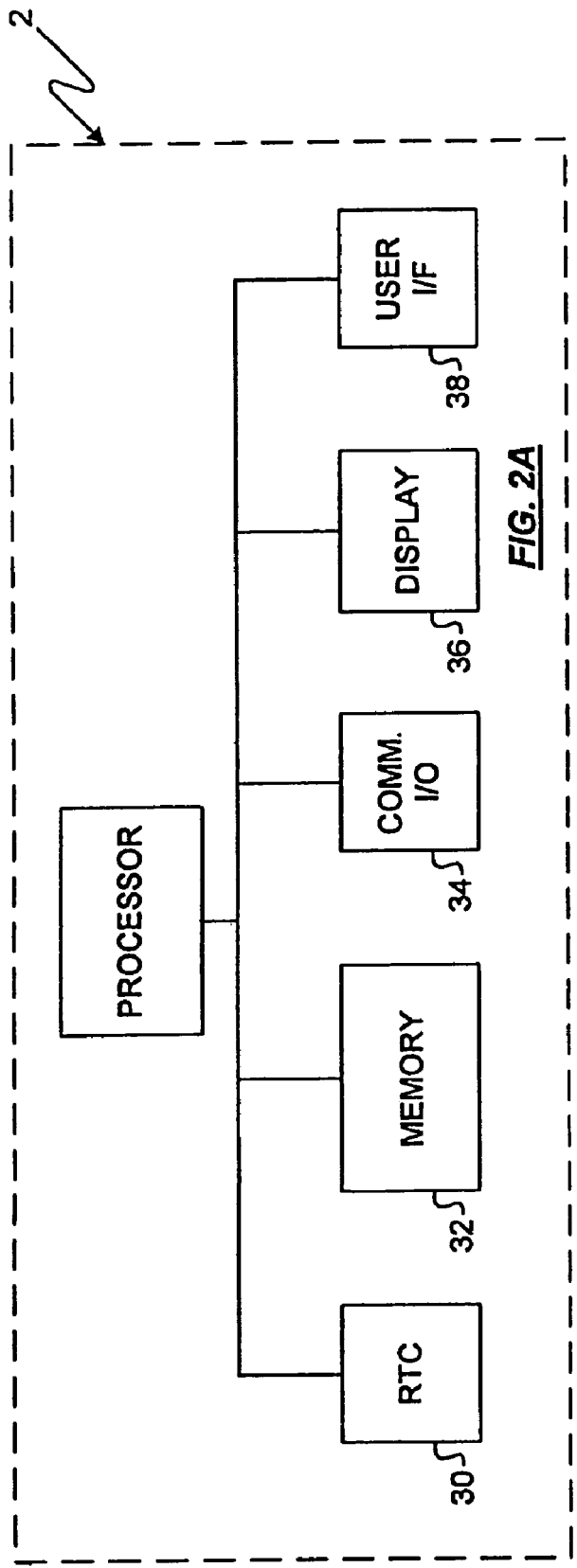
FIG. 2A is a block diagram illustrating an imaging appliance, according to a preferred embodiment.
FIG. 2B is a block diagram illustrating a data structure of the memory illustrated in FIG. 2A, according to a preferred embodiment.

Now referring to. FIG. 2A, there is illustrated a block diagram of a portion of a typical imaging appliance 2. Each imaging appliance 2 preferably includes a real-time clock 30, a memory 32, a communications unit 34, a display 36 and a user interface 38. The real-time clock 30 maintains the current date and time. The real-time clock 30 is connected to a battery for maintaining date/time after the imaging appliance 2 is powered-off. In a family 4, the real-time clocks 30 of each family member may be synchronized to facilitate easier organization and ordering of images. The communications unit 34 handles communications with other imaging appliances 2 according to standard networking protocols.

The display 36 and user interface 38 vary according to the type of imaging appliance 2. Preferably, each display 36 includes the capability to display images; and each user interface 38 includes the capability to display status and control options, and receive user input. Other variations are possible. For example, while some imaging appliances 2 may have a separate display 35 and user interface 38, other imaging appliances may combine the display 36 and user interface 38 into a single component, such as a touch-screen display. Yet other imaging appliances 2 may use the display 36 to display images, status and control options and provide a simple user interface comprising control buttons for providing user input responsive to the status and control presented on the display 36.

Referring now to FIG. 2B, the memory 32 is configured to hold family information (i.e., information related to the family) and appliance information (i.e., attributes of a particular family member) in a registry or database 40. Family information includes a single family identifier 42 (e.g., domain name or network) to uniquely identify each family 4, and two or more family member identifiers 44 (e.g., address) to uniquely identify each member of the family 4.

The family member identifier 44 is preferably comprised of both a typical computer address and a human-centered address. The computer address is preferably hidden from user view. The human-centered address is preferably a thumbnail image that can be viewed on a display 36 of each family memory for convenient selection and addressing of family members to share image data and control. Thus, each imaging appliance 2 includes a thumbnail associated with it that identifies it to other appliances. For example, if a first family member wishes to send an image to a second family member from his camera 10, the first family member may look at thumbnail images of other people in the family 4 using the display 36 of his camera 10 to identify the second family member. An image of the imaging appliance 2 itself is used as a default image. For a more intuitive selection, the default image can be replaced with an image of the owner, user, a location people, or any other identifying characteristics of the imaging appliance 2. Alphanumerics could be superimposed as added annotation. Thus, the human-centered address provides non-technical users with a simple way to address other members of the family 4.

Appliance information includes a family member identification 44 and one or more attributes 46. Imaging appliance attributes 46 identify what an imaging appliance 2 can do and how it works. Attribute information 46 helps family members understand the special features and characteristics about the other family members so that the family 4 of imaging appliances 2 can dynamically cooperate together as a system and share operations and data. For example, cameras 10 may share attribute information 46 about shutter speed, lens focal length, aperture range, flash, shutter trigger synch, etc. Attributes 46 may identify a feature, such as whether the printer 16 is color or black and white. Attributes 46 may also specify available operations, such as whether an imaging appliance 2 can automatically forward images to the linked printer 16. Attributes may also specify certain configurations, such as whether a camera 10 should broadcast every captured image or send the images to a particular imaging appliance 2. Attributes also specify whether a particular feature or characteristic is public or private and whether an imaging appliance 2 is a master with respect to certain command and control operations. For example, one of the cameras 10 may command other cameras 10 to fire simultaneously, so that all cameras 10 within a family cooperate to capture a series of images for a panoramic photo. Many other attributes 46 are possible depending on appliance types and capabilities.

When imaging appliances 2 are introduced, each imaging appliance 2 records, in its own registry 40, family and appliance information relating to the imaging appliance 2 it was introduced to, such as family identifier and identifiers of other members of the family 4. Once a family 4 of imaging appliances 2 is created, the imaging appliances 2 remain logically connected until they are removed from the family 4 and the family information is removed from the registry 40 of the family members.

Within the family 4, each imaging appliance 2 can share operations, such as data, control and status information according to the attribute information 46. Data includes images and family information. Control includes commands to: transfer an image (either pushing or pulling) between appliances; transfer other data between appliances; simultaneously trigger camera shutters; time delay camera shutters; time sequence camera shutters; centralize image collection; and centralize image enumeration. Status includes physical presence (e.g., in-range) queries; storage capacity queries; and family member status queries. Data may be encrypted for sharing with only certain family members.

Figure 3:
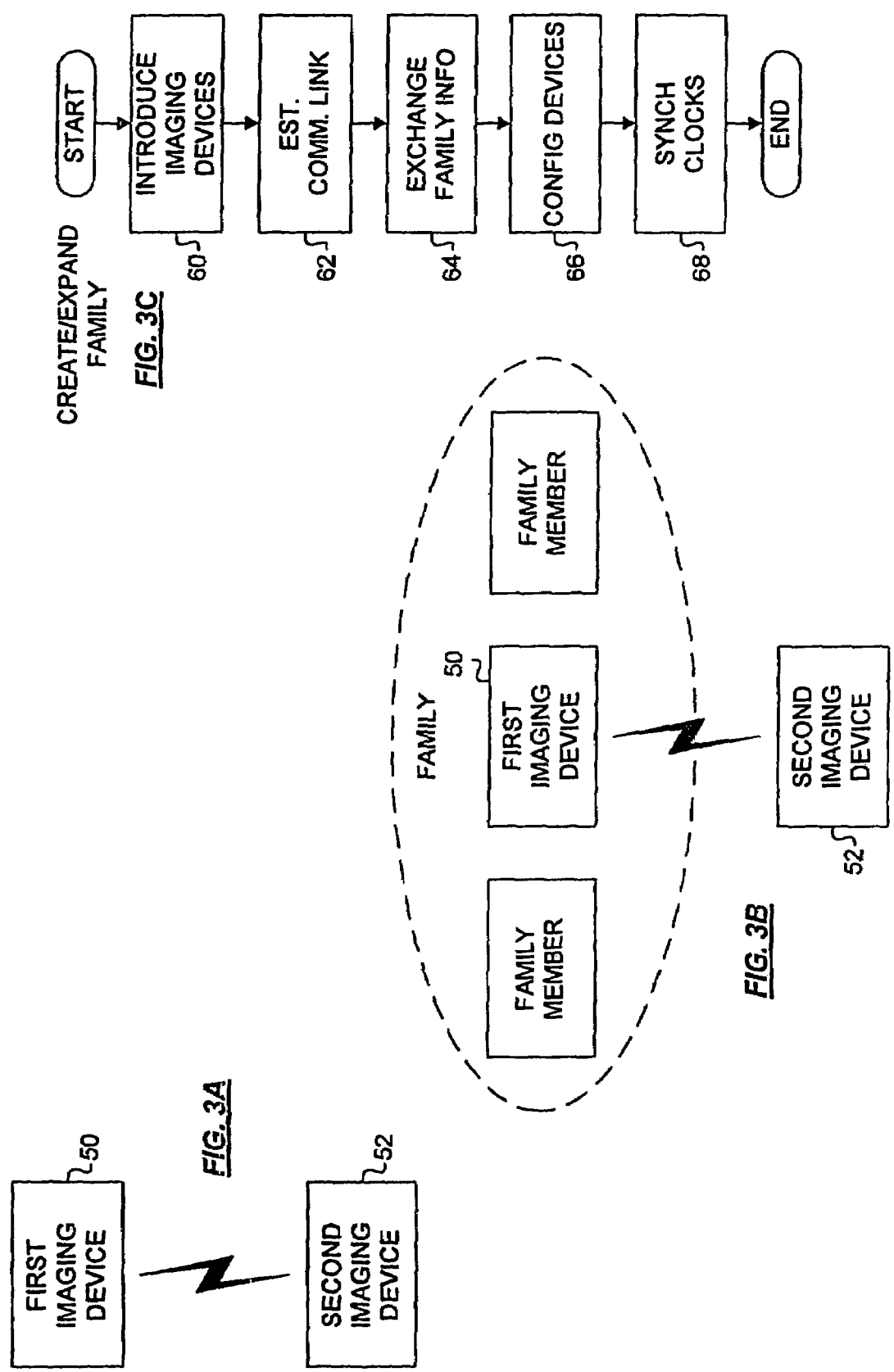
FIG. 3A is a block diagram illustrating two imaging appliances communicating to create a family.
FIG. 3B is a block diagram illustrating two imaging appliances communicating to expand a family.
FIG. 3C is a flow diagram illustrating method of creating/expanding a family of imaging appliances, according to a preferred embodiment.

Now referring to FIGS. 3A-C, there is illustrated a method of creating/expanding a family between two imaging appliances 2. The method assumes the appliances are in-range of each other. A family 4 may be first formed if neither a first or second imaging appliance belongs to a family. Otherwise, if one of the imaging appliances already belongs to a family 4 and invites the other imaging appliance to join, the other imaging appliance is added to the existing family.

At a step 60, a first imaging appliance 50 is introduced to a second imaging appliance 52. Preferably, a simple yet affirmative user act is used to introduce the appliances such as, actuating a button substantially simultaneously on both imaging appliances. Alternatively, introduction could be triggered by touching the imaging appliances together (e.g., electrically sensing the presence of the other appliance); a user touching two imaging appliances simultaneously thereby creating a body circuit that can be detected by each imaging appliance; pointing the imaging appliances at each other in a unique way; or having the imaging appliances periodically poll for new imaging appliances and alert the user when one is identified.

Once introduced, at step 62 the first 50 and second 52 imaging appliances exchange network addresses to establish a communications link, according to standard network protocols. As part of the computer network addresses, the imaging appliances 50 and 52 also exchange the human-centric addresses to create a thumbnail address book.

Next at step 64, the imaging appliances 50 and 52 exchange family and appliance information. If the first 50 and second 52 imaging appliances are creating an original family, they compute a unique family identifier 42 based on an exclusive OR of each other's network addresses with it's own or some other method of creating a unique number from the two addresses. If the first imaging appliance 50 already belongs to a family 4, the first imaging appliance 50 automatically sends the unique family identifier 42 of the existing family 4 to the second imaging appliance 52. The exchange of family and appliance information includes the unique family identifier 42, unique family member identifiers 44 and appliance attributes 46, all of which are recorded in the registry 40 of each imaging appliance 50 and 52. Developing and maintaining a registry 40 of family members and their respective attributes 42 within each family member creates a family 4.

Next at step 66, each imaging appliance 50 and 52 configures itself according to the family and appliance information exchanged. For example, a computer 18 (i.e., central image repository) may possess attributes 46 that cause every camera 10 to configure itself to automatically forward captured images to the computer 18. An electronic picture frame 24 may exchange attributes that cause the computer 18 to periodically push images to the electronic picture frame 24.

Next at step 68, the real-time clocks 30 of each imaging appliance 50 and 52 are synchronized. This step is particularly relevant for image capture appliances, such as cameras 10-12 and scanners 14, that may record a date/time tag with a captured image file. By synchronizing the real-time clocks 30 between multiple imaging appliances 2, image ordering on images that are captured by different imaging appliances is easily facilitated based on the date/time tags.

Before discussing the synchronization of multiple appliances, it is useful to discuss the synchronization of a single imaging appliance. Imaging appliances may automatically synchronize their clocks 30 to an external time source. To enable such action, the imaging appliances are selectively configurable to request date/time information during user initialization or automatically receive date/time information at power-up. If so configured, at power-up the imaging appliance 2 receives date/time information from an external source, such as a computer, a docking bay, power supply or broadcast signal. For example, a receiver can be incorporated into an imaging appliance 2 to receive a broadcast time signal such as the NIST (National Institute of Standards and Technology) short-wave broadcast, or an extended data signal from a PBS (Public Broadcasting Station) television. In another example, when the imaging appliance 2 is connected to a main power supply or docking station that has a time sync pulse, the real-time clock 30 could be automatically set by the pulse. Thus, using a method such as the ones described above, each imaging appliance initializes its own real-time clock 30. When the time is set, a synch tag is written with the current time to record when the real-time clock was last set.

When the two imaging appliances 50 and 52 are synchronized in step 68, one of the imaging appliances 2 in the family 4 is preferably used as a reference time source for the other. If a family has already been established, such as in FIG. 3B, the reference time source will be a known family member. The imaging appliances 50 and 52 simply receive the date/time from the reference time source. If a family is first being created, the imaging appliances 50 and 52 determine who is to be the reference time source. The real-time clock 30 of one imaging appliance 2 will take priority over the other based on the synch tag, power-on time tag or user determination. Each imaging appliance may include the synch tag, power-on tag or both.

The synch tags indicate when the imaging appliances had their real-time clocks 30 last adjusted. The most recently adjusted real-time clock 30 takes precedence over the other. The power-on time tag indicates when the imaging appliance 50 or 52 was powered on. The most recently powered-on imaging appliance 2 will take the time from the longer-powered appliance. The synch tag takes precedence over the power-on tag. If neither tag exists, then the imaging appliances may request the user to enter the time. The family creation method is then complete.

Once the imaging appliances 2 are logically linked into a family 4, the family members remain linked until or unless the linkage is explicitly broken by the user. Thus, the family members "remember" the other appliances within the family 4 in a persistent relationship, even when not in communications range or when powered-off. Re-introduction is not necessary.

As a further variation, privacy and security of family members may be provided with the creation of a shared encryption key. The key would be exchanged at the time of introduction and then be used for encrypting all future communications between the appliances. This is especially important for wireless or public networks.

Figure 4:
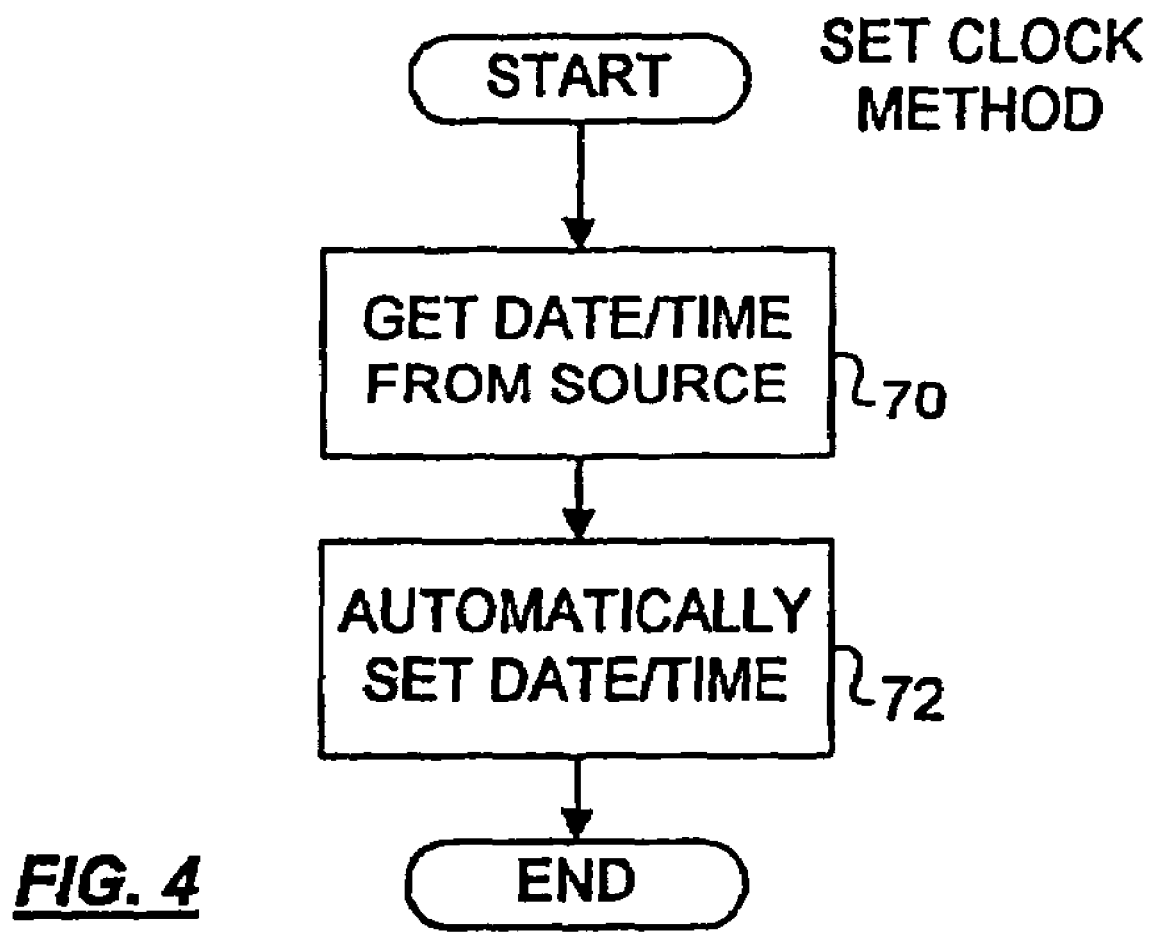
FIG. 4 is a flow diagram illustrating a method of setting a clock of an imaging appliance, according to a preferred embodiment.

Referring now to FIG. 4, there is illustrated a method of synchronizing a real-time clock 30 of an individual imaging appliance 2 to an external source on demand. Imaging appliances 2 are selectively configurable to automatically set their real-time clocks 30 at initialization or power-up according to an external time source, such as a connected computer. Alternative external clock synchronization sources include: a broadcast signal, a power supply, docking bay or another imaging appliance. For example, a radio receiver could be incorporated into an imaging appliance 2 to receive a broadcast time signal such as the NIST (national institute of standards and technology) short-wave broadcasts of time on radio station WWV. With knowledge of the current time zone, the imaging appliance could automatically set its real-time clock 30 to the local time or to an absolute time such as GMT (Greenwich Mean Time). As another example, when the imaging appliance 2 is connected to a host computer the time on the imaging appliance 2 could be automatically updated from the host computer or another computer connected to the host computer, such as a computer on the internet. In another example, when the imaging appliance 2 is connected to a main power supply or docking station that has a time sync pulse, the real-time clock 30 could be automatically set by the pulse.

The method may be configured for execution at appliance power-up. The method can performed at every power-up or only the first time the imaging appliance is initialized after a battery is installed. At a step 70, the date/time settings are received from one of the external clock sources listed above, such as a connected computer. Next at step 72, the real-time clock 30 is re-set according to the date/time settings, thereby synchronizing the imaging appliance 2 with the external time source.

Figure 5:
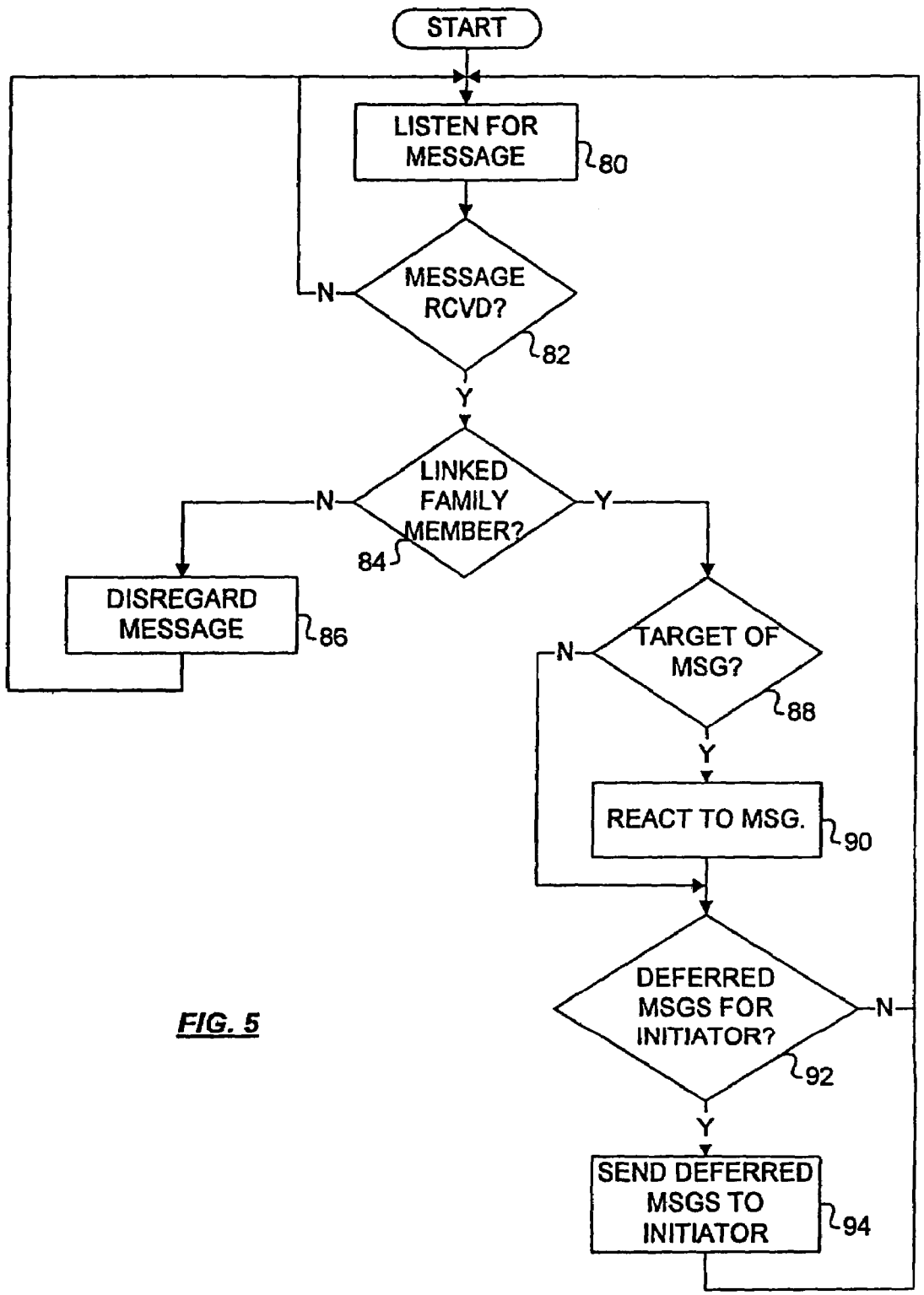
FIG. 5 is a flow diagram illustrating a method of handling communications received by a member of a networked family of imaging appliances, according to a preferred embodiment.

Now referring to FIG. 5, there is illustrated a method performed by an imaging appliance 2 for communicating with other imaging appliances 2. The imaging appliance 2 performing the present process will be referred to as the listener imaging appliance. At a step 80, the listener imaging appliance 2 listens for an incoming message from another imaging appliance. If a message not is received, at step 82 the process returns to step 80 to continue listening. Otherwise, if a message is received, the process branches from step 82 to step 84.

At step 84, the listener imaging appliance determines whether the message received in step 80 is from a linked family member. Each message includes a header that contains information on the source and destination address of the message. The listener imaging appliance can compare the source address with the previously linked family members listed in the registry 38. If not from a linked family member, the message is discarded at step 86 and the listener imaging appliance returns to listening for incoming messages. If the message is from a linked family member, the process branches to step 88 where the listener imaging appliance determines whether it is the target of the message by reading information from the message header. If the listener imaging appliance is the target of the message, the process continues to step 90 where the message is parsed and any commands are executed. For example, the message could command a camera 10 to trigger its shutter. If at step 88 the process determines that the listener imaging appliance is not the target of the message, the process branches to step 92 where the listener imaging appliance determines if there are any deferred messages queued for the source of the message.

Imaging appliances 2 that are members of a family 4 may not always be able to immediately communicate with each other. For example, two imaging appliances communicating wirelessly may be out of range of each other if separated by enough distance. When the imaging appliances 2 are not able to communicate but still logically connected to the family, operations can be deferred by adding the messages to a deferred queue. When communications between the imaging, appliances 2 are re-established, the operations that were deferred can be executed. If the message is from a source that has messages on the deferred message queue, then the process branches from step 92 to step 94 to communicate the messages. Otherwise, the process branches from step 92 back to step 80 to resume listening for additional messages.

Figure 6:
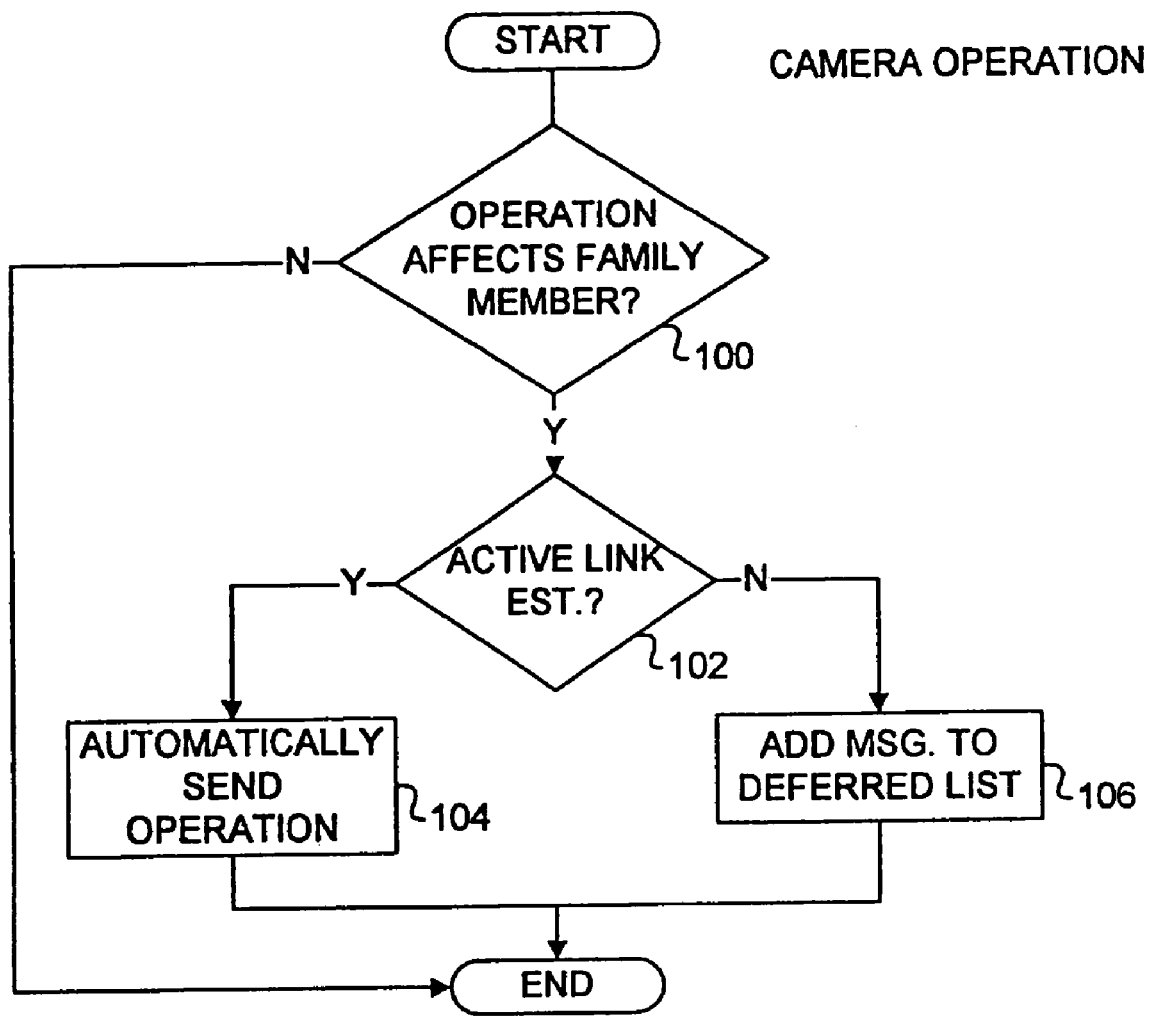
FIG. 6 is a flow diagram illustrating a method of performing operations by an imaging appliance linked to a networked family of imaging appliances, according to a preferred embodiment.

Now referring to FIG. 6, there is illustrated an automatic operation launching process performed by an initiator imaging appliance 2 linked to a family. The process is triggered when a user causes a native operation of the initiator imaging appliance 2 to be performed, such as scanning, printing, capturing images, etc. As a result of the native operation, a conditional operation may be automatically performed to communicate data, control or status information to a target imaging appliance 2, based on the attributes 46 received from other family members. For example, when a camera 10 captures and image, the following process running on the camera 10 may cause the camera to automatically forward a copy of the image to the PC 18, or send the image to the printer 16. Thus, the forwarding operation is conditional on the native operation capturing an image.

Once a native operation is completed, at step 100 the initiator imaging appliance 2 first checks its registry 38 to determine if the native operation is associated with any conditional operations of linked family members. When imaging appliances 2 are introduced and registered, conditional operations may be exchanged as part of the family information stored in the registry 38. For example, when the printer 16 is linked to the camera 10 and entered into the registry 38 of the camera, the printer 16 may communicate family information to the camera that causes the camera to send captured images to the printer 16 after every exposure. Thus, with respect to the camera 10, a conditional printing operation is associated with the linked printer 16.

If no family members are affected by the native operation, the process terminates. If a conditional operation is associated with the native operation, the process branches from step 1100 to step 102. At step 102, the initiator imaging appliance 2 checks to see if the target imaging appliance associated with the conditional operation is actively linked. If an active link is not present, the conditional operation is added to the deferred message queue at step 106. If an active link is present, then at step 104 the conditional operation is sent to the target imaging appliance. It is understood that a series of messages may be required instead of a single message.

Figure 7:
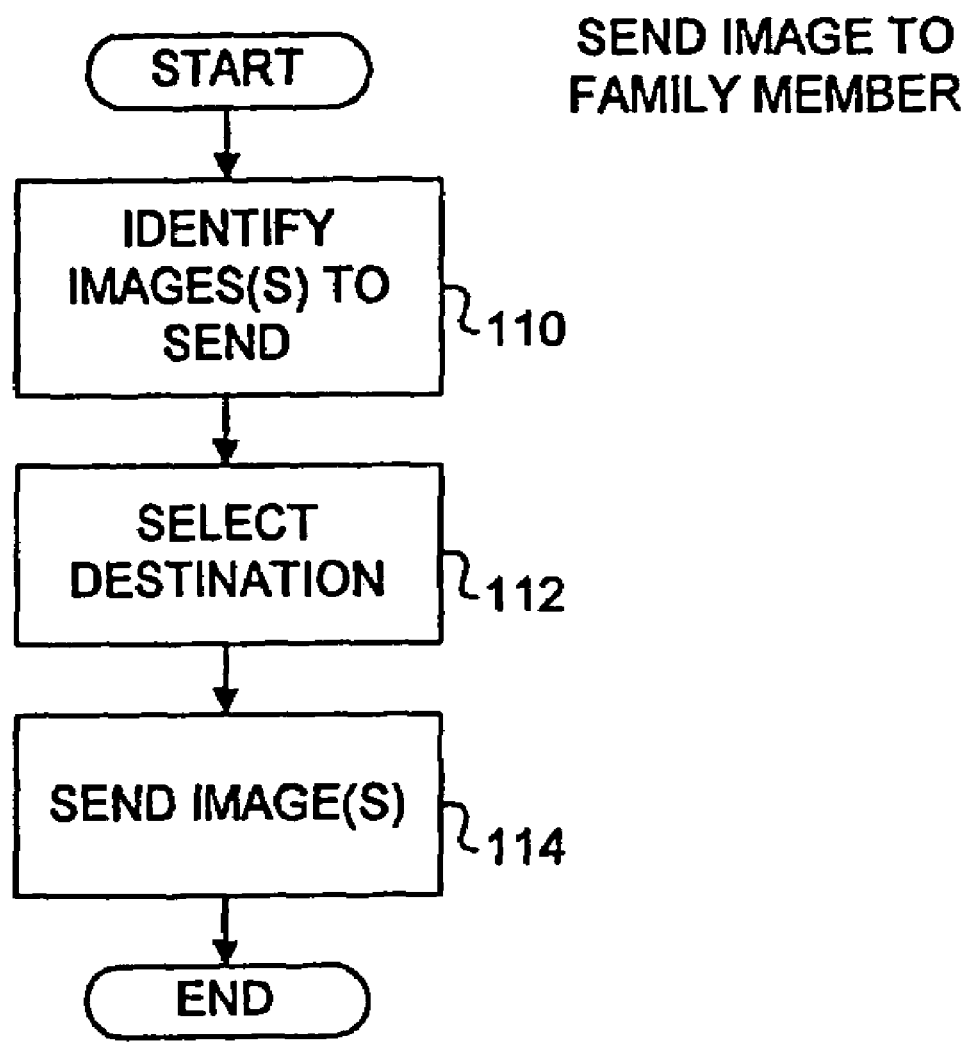
FIG. 7 is a flow diagram illustrating a method of addressing a member of the networked family of imaging appliances, according to a preferred embodiment.

Now referring to FIG. 7, there is illustrated a user-initiated file transfer performed by an imaging appliance 2 linked to a family 4. For example, a user may wish to transfer images from a first camera 50 to a second camera 52 of the family 4. At a step 110, the user uses the display 36 on the first camera 50 to select one or more images to transfer. A thumbnail of each selectable image may be shown or filenames of each selectable image may be shown.

At a step 112, the user uses the display 36 to select one or more destinations. The destinations are conveniently selectable by scrolling through a list of the human-centric addresses viewed on the display 36. Thus, the human-centered addresses provide a simple means to address other imaging appliances 2. Finally, at a step 114 the selected images are sent to the selected destinations.

Therefore, it can be seen from the foregoing that the invention provides a network of dynamically configurable imaging appliances to form a cooperative imaging system. Although several embodiments and variations of the invention have been described and illustrated, the invention is not to be limited to the specific forms or arrangements of the parts so described and illustrated. Thus, having illustrated and described the principles of the invention in a preferred embodiment, it should be apparent to those of ordinary skill in the art that the invention can be modified in arrangement and detail without departing from such principles.

What is claimed is:

1. A method for establishing a relationship between a first camera and a group of cameras, wherein relationships exist between said cameras in said group, said method comprising:

locating said first camera proximate a second camera; said second camera being in a persistent relationship with at least one third camera; said second camera and said third camera comprising said group; and said locating causing said first camera to link with said second camera in a persistent relationship; said linking causing said first camera to be in a persistent relationship with said third camera;

wherein said locating enables the transfer of data between said first camera and said second camera.

2. The method of claim 1 and further comprising linking said group to an imaging appliance.

3. The method of claim 1, wherein the linking of said first camera to said second camera further comprises simultaneously actuating switches located on said first camera and said second camera.

4. The method of claim 1, wherein said locating comprises electrically contacting said first camera to said second camera.

5. The method of claim 1, wherein said causing said first camera to link to said second camera comprises exchanging a shared encryption key between said first camera and said second camera, and wherein said method further comprises securely communicating between first camera and said second camera using said shared encryption key.

6. The method of claim 1 and further comprising establishing a protocol for automatically exchanging data between said first camera and said second camera subsequent to said linking.

7. The method of claim 1 and further comprising:

determining if communications between said first camera and said second camera have failed; and automatically re-establishing communications between said first camera and said second camera if said communications failed.

8. The method of claim 1 and further comprising displaying an indication on said first camera identifying at least one camera in said group.

9. The method of claim 1 and further comprising unlinking said first camera from said group, wherein said unlinking comprises instructing one of said cameras to unlink.

10. The method of claim 1, wherein said group further comprises a printer, and wherein said linking comprises linking said first camera to said printer.

11. The method of claim 1 and further comprising introducing a fourth camera to said first camera and linking said first camera with said fourth camera in a persistent relationship.

12. A camera comprising:

sending means for sending an introduction indication to a second camera when said first camera is located proximate said second camera, said second camera being linked to a third camera, wherein said sending means comprises a means for electrically connecting said camera to said second camera, said electrically connecting enabling the transfer of data between said cameras; and communication means for communicating with said second camera and said third camera in a persistent relationship subsequent to said introduction.

13. The camera of claim 12, wherein said communication means comprises a means for exchanging a shared encryption key for secure communications between said cameras.

14. The camera of claim 12 and further comprising a display means for displaying information as to whether said second camera is linked to said camera.

* * * * *

UNITED STATES PATENT AND TRADEMARK OFFICE
CERTIFICATE OF CORRECTION

| | | |
|---|---|---|
| PATENT NO. | : 7,349,117 B2 | Page 1 of 1 |
| APPLICATION NO. | : 11/096339 | |
| DATED | : March 25, 2008 | |
| INVENTOR(S) | : Donald J. Staveley et al. | |

It is certified that error appears in the above-identified patent and that said Letters Patent is hereby corrected as shown below:

In column 5, line 43, after "family" insert -- 4 --.

In column 8, line 13, after "can" insert -- be --.

In column 9, line 32, delete "1100" and insert -- 100 --, therefor.

Signed and Sealed this

Nineteenth Day of August, 2008

JON W. DUDAS
*Director of the United States Patent and Trademark Office*